June 25, 1929. S. J. NORDSTROM Re. 17,338

VALVE

Original Filed Oct. 18, 1927

INVENTOR
Sven Johan Nordstrom
BY
Archibald Coy
ATTORNEY

Reissued June 25, 1929. Re. 17,338

UNITED STATES PATENT OFFICE.

SVEN JOHAN NORDSTROM, OF OAKLAND, CALIFORNIA, ASSIGNOR TO MERCO NORDSTROM VALVE COMPANY, OF SAN FRANCISCO, CALIFORNIA, A CORPORATION OF DELAWARE.

VALVE.

Original No. 1,683,257, dated September 4, 1928, Serial No. 226,867, filed October 18, 1927. Application for reissue filed March 1, 1929. Serial No. 343,815.

The invention relates to an improvement in valves, and more particularly to an improvement in pressure lubricated plug valves of the type in which a chamber is provided between the smaller end of the plug and the adjacent wall of the casing for containing lubricant which is put under pressure to lift the plug from its seat.

Figure 2:
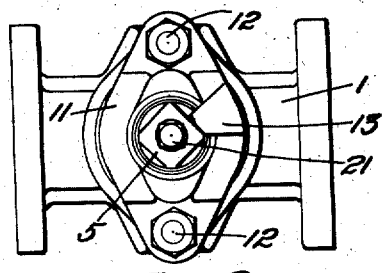

When the valve is assembled at the factory, it is customary to fill all the interstices between the plug and casing, including said chamber, with a staple lubricant which is called an assembling lubricant. This assembling lubricant is suitable for lubricating the bearing surfaces of the valve under ordinary conditions of service. Inasmuch as the valves are usually made up in stock lots, and are tested before being placed in the stock room, it has been found inexpedient to assemble the valves with lubricant especially adapted for any particular kind of service. Many valves, however, are used for special services requiring particular kinds of lubricant, and in such services the assembling lubricant would not be suitable. For example, the valves employed in handling gasoline require specially prepared lubricants which will not dissolve in the gasoline, and valves used in high temperature service and for handling alkalis, acids, and other mordant substances require lubricants which heat and these substances will not affect. The result is that when the valve packed with the assembling lubricant reaches the place where it is to be used for the special service requiring a lubricant particularly adapted for that service, it is necessary to dissassemble the valve, remove the lubricant from the chamber between the smaller end of the plug and the adjacent side of the casing, from the lubricating grooves in the plug or casing, and from the reservoir, and to repack these spaces with the special lubricant. Not only does this require considerable time, but it also means the waste of the assembling lubricant. Accordingly, much effort has been expended in finding a universal lubricant for all services, but this idea is now recognized as impracticable. Likewise, much effort has been expended in finding a suitable material for occupying the greater part of the space between the smaller end of the plug and the adjacent wall of the casing, especially in large size valves, because the waste of lubricant in the larger valves is considerable when they must be disassembled, cleaned out and repacked with a special lubricant. But up to the time of the discovery of the present invention no suitable space filling material had been found and it was still customary to send out the valves packed with an assembling lubricant which had to be changed at the expense of considerable effort, time and lubricant, if the valve was to be employed in some service requiring a special lubricant. I have discovered that if the chamber between the smaller end of the plug and the adjacent wall of the casing is almost entirely filled with powdered mica, leaving only a relatively narrow space between the upper surface of the mica and the end of the plug, that a great saving of time, labor and lubricant is effected in adapting the valve to its special service and also that a more efficient valve is produced, as will more fully appear in the following detailed description, the novel features of the invention being particularly pointed out in the appended claims In the accompanying drawings illustrating the preferred form of the invention, Fig. 1 is a longitudinal section through the improved valve, with the plug in closed position; and Fig. 2 is a top plan on a reduced scale of the valve parts shown in Fig. 1.

The improved valve as illustrated in the drawings comprises a casing 1 having a longitudinal passageway 2 therethrough and a tapered valve seat 3 formed transversely of the passageway 2. A tapered plug 4 is seated in the valve seat 3 and is provided with a stem 4′ which projects outwardly through the top side of the casing, assuming the valve to have the position shown in Fig. 1. The outer extremity 5 of the valve stem 4′ is squared to receive a wrench by which the plug may be manipulated to open and close the valve. As illustrated the valve is shown in closed position. When turned through an angle of 90° to open position, the opening 6 in the plug registers with the passageway 2 through the casing. Above the larger end 7 of the plug 4, the upper part of the casing 1 is provided with an annular recess, the lower part of which constitutes a shoulder 8 on which is seated the outer edge of a washer 9, the inner edge of which bears upon the upper end 7 of the plug. Seated upon the washer 9 is a ring of packing material 10 which is put under compression to hold the plug with suitable tightness against the valve seat 3 by means of a cover 11 secured to the casing 1 by means of the bolts 12. The projection 13 on the cover 11 enters the recessed part 14 of the valve stem 4′ and by engagement with the ends of the recess 14 determines the angle of 90° through which the plug may be turned from open to closed positions and vice versa.

Figure 1:
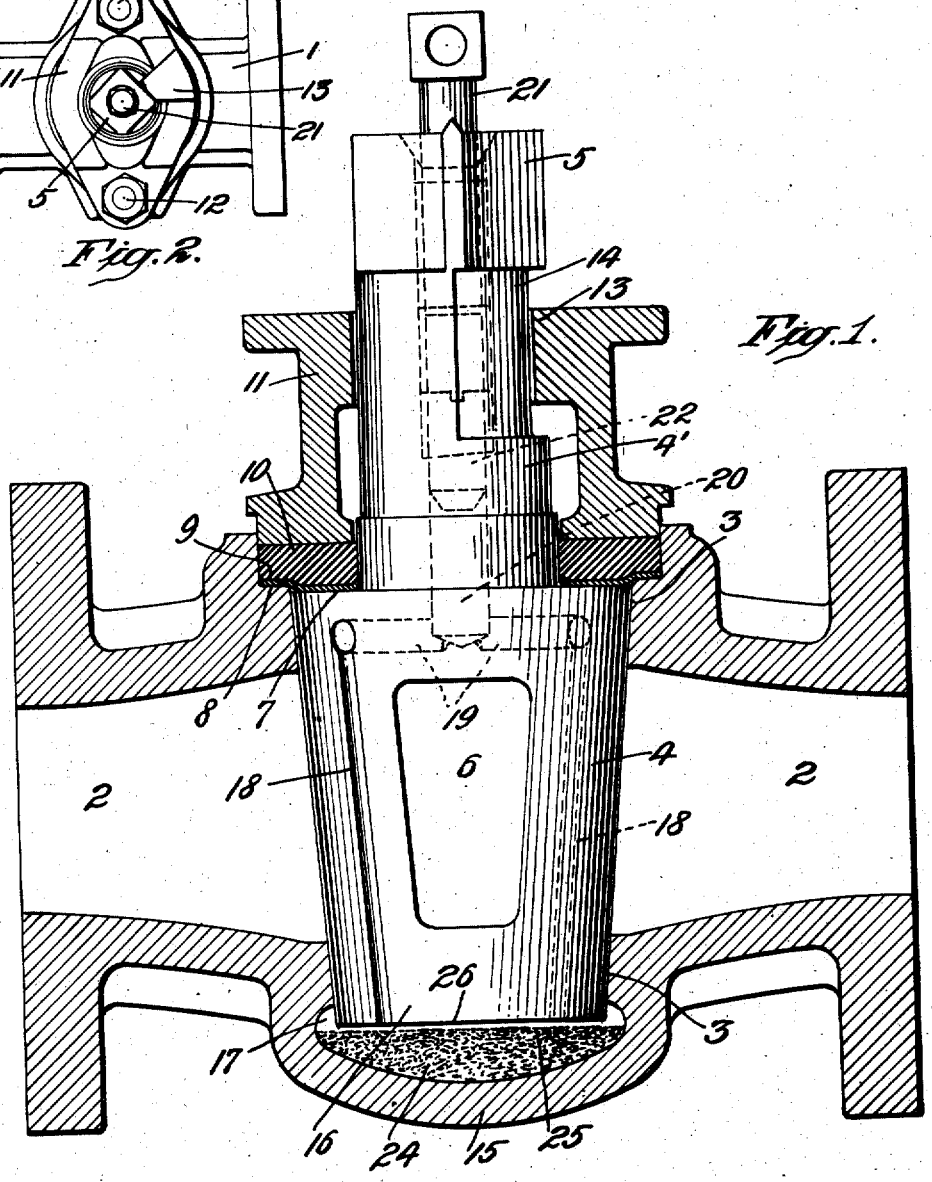

The side or wall 15 of the casing adjacent the smaller end 16 of the plug is provided with the usual chamber 17 into which the smaller end of the plug projects, as shown in Fig. 1. As these valves have heretofore been constructed, this recess has been known as the lubricant chamber and when it has been filled with lubricant and this lubricant put under pressure, the plug 4 is lifted from its seat so that when the plug is turned the lubricant in the longitudinal lubricating grooves 18 in the plug surface smears over the valve seat 3 and thereby lubricates the bearing surfaces between the valve seat and the plug. The upper ends of the grooves 18 connect by the transverse holes 19 with the inner end of a reservoir 20 formed axially in the valve stem 4′. A pressure screw 21 is threaded into the outer end of the reservoir 20 and when it is turned inwardly the lubricant in the reservoir 20 is forced through the holes 19 down through the grooves 18 and into the chamber 17, whereby the plug is lifted and the seating surface of the plug and valve seat lubricated. Between the inner end of the pressure screw 21 and the bottom part of the reservoir 20 is interposed a check valve 22 to prevent backflow of lubricant.

As pointed out above, when valves of this description are assembled for testing in the factory, it is necessary to fill the reservoir 20, the lubricating grooves 18 and the chamber 17 with lubricant. On the completion of the test, this lubricant remains in the valve when it is shipped to the purchaser. If the valve is to be used for a service not requiring a lubricant having special ingredients, the lubricant already in the valve will satisfactorily lubricate the bearing surfaces of the plug and casing. If, however, the valve is to be put to a use necessitating some special lubricant, it is necessary to disassemble the valve and remove all of the lubricant from the reservoir, the lubricating grooves and the chamber. To obviate the necessity for this time consuming and wasteful method of providing the valve with its necessary lubricant, I introduce powdered mica 24 into the chamber 17, filling it to about the point 25 so that when the plug is inserted in the casing there will be left only a relatively narrow space between the top surface of the mass of powdered mica and the bottom end 26 of the plug. It is considered desirable to leave a slight space between the mica and the end of the plug to be filled with lubricant, although the pressure lubrication feature will function when the end of the plug contacts with the mica. When the plug 4 is in position in the valve seat 3, the other parts of the valve are then assembled to hold the plug in the casing. The pressure screw 21 having been removed, sticks or cartridges of assembling lubricant are inserted in the upper end of the reservoir 20 and then the pressure screw 21 is reinserted and is turned inwardly to force the lubricant down through the channels 18 to fill the space between the mica and the bottom end the plug. Only a relatively small amount of lubricant is required to fill the unoccupied space in the chamber 17, the grooves 18 and the reservoir 20. Consequently, if the valve is to be used for some service requiring a special lubricant, it is simply necessary for the operator to remove the pressure screw 21, insert cartridges of the necessary kind of lubricant and turn inwardly on the screw 21. The new lubricant forces the assembling lubricant out of the reservoir 20 and the lubricating grooves 18. The very small amount of the assembling lubricant remaining in the space between the mica and the smaller end of the plug soon dissipates in service and is replaced by the special lubricant. Thus by filling the greater portion of the chamber 17 with powdered mica, it is unnecessary to disassemble the valve and clean out the assembling lubricant when the valve is to be supplied with a special lubricant.

The present method of assembling pressure lubricated valves with the chamber 17 substantially filled with powdered mica has been found highly successful in use, saving much time, labor and lubricant, and resulting in a more efficiently operating valve. When the lubricant is put under pressure and is forced into the space between the mica and the smaller end of the plug, the powdered mica is compressed, and consequently whenever the plug is turned the pressure under which the mica is held in the chamber 17 acts to force lubricant up between the side walls of the lower end of the plug and the adjacent side walls of the valve seat 3. This action takes place because the turning of the plug momentarily loosens the plug and affords the lubricant under pressure between the mica and the plug an opportunity to lift the plug slightly and thereby force a small amount of lubricant from the chamber into the space between the plug and the valve seat. The lubricant in the grooves 18 being also under pressure smears over the adjacent parts of the valve seat as the plug is turned. Also, as will be obvious, the lubricant between the bottom end 26 of the plug and the compressed mica in the chamber 17 being under the pressure of the mica, some of this lubricant will work its way upwardly into the grooves 18 to replace therein the lubricant which has become dissipated during the use of the valve.

The mica is unaffected by any condition of service to which the valve may be put, such as high temperature service, or for handling oils, alkalis, or acids. And the powdered mica retains its resiliency while the valve remains in service. I have found that a 250 mesh mica is entirely satisfactory for the purposes of the invention.

Having thus described the invention, what I claim as new is:—

1. A valve comprising, a casing having a passageway therethrough and a valve seat formed transversely of the passageway, a plug seated in the valve seat and having a hole adapted to register with the passageway, said casing having a space forming a chamber into which the smaller end of the plug projects, powdered mica filling said chamber up to substantially the smaller end of the plug and means for forcing lubricant under pressure into the chamber to compress the mica and fill the space between the mica and the end of the plug.

2. A valve comprising, a casing having a passageway therethrough and a valve seat formed transversely of the passageway, a plug seated in the valve seat and having a hole adapted to register with the passageway, said casing having a space forming a chamber into which the smaller end of the plug projects, said chamber being nearly filled with powdered mica, longitudinal grooves in the seating surface between the plug and the valve seat extending into the chamber, and means for forcing lubricant under pressure through the grooves into the chamber to fill the space between the mica and the end of the plug.

3. A valve comprising, a casing having a passageway therethrough and a seat formed transversely of the passageway, a plug mounted in the seat and having a hole adapted to register with the passageway, the valve having channels for supplying lubricant to the seating surfaces of the plug and the casing, means for introducing lubricant of the viscosity of lubricant in stick or cartridge form into the valve, means for forcing lubricant in one direction through the channels, means for receiving and storing the lubricant forced through the channels, and resilient means for returning the stored lubricant into the channels.

4. A valve comprising, a casing having a passageway therethrough and a tapered valve seat formed transversely of the passageway, a tapered plug seated in the valve seat and having a hole adapted to register with the passageway, the casing having a space forming a chamber into which the smaller end of the plug projects, the valve having channels for supplying lubricant to the seating surfaces of the plug and the casing, said channels extending to the chamber, means for forcing lubricant through the channels and into the chamber, and resilient means in the chamber for forcing lubricant from the chamber back into the channels.

5. A valve comprising, a casing having a passageway therethrough and a tapered valve seat formed transversely of the passageway, a tapered plug seated in the valve seat and having a hole adapted to register with the passageway, the casing having a space forming a chamber into which the smaller end of the plug projects, the valve having longitudinally arranged channels for supplying lubricant to the seating surfaces of the plug and the casing, said channels extending to the chamber, means connected with the larger end of the plug for forcing lubricant through the channels and into the chamber, and finely divided resilient material in the chamber for forcing lubricant from the chamber back into the channels.

6. A valve comprising, a casing having a passageway therethrough and a tapered valve seat formed transversely of the passageway, a tapered plug seated in the valve seat and having a hole adapted to register with the passageway, said casing having a space forming a chamber into which the smaller end of the plug projects, a finely divided resilient material in said chamber, and means for forcing lubricant under pressure into the chamber to compress the material therein so that it will force the lubricant against the smaller end of the plug.

7. A valve comprising, a casing having a passageway therethrough and a plug rotatably mounted in the casing for controlling the passageway, the casing having a space forming a chamber into which one end of the plug projects, the valve having channels for supplying lubricant to the seating surfaces of the plug and the casing, said channels extending to the chamber, means for introducing lubricant of the viscosity of lubricant in stick or cartridge form into the valve, means for forcing lubricant through the channels and into the chamber, and resilient means in the chamber for forcing lubricant from the chamber back into the channels.

8. A valve comprising, a casing having a passageway therethrough and a plug rotatably mounted in the casing for controlling the passageway, the valve having a space forming a chamber adapted to receive lubricant, means for introducing lubricant of the viscosity of lubricant in stick or cartridge form into the valve, the valve having channels for supplying lubricant to the seating surfaces of the plug and the casing, said channels being in communication with the chamber, means for forcing lubricant through the channels and into the chamber, and resilient means in the chamber for forcing lubricant from the chamber back into the channels.

9. A valve comprising, a casing having a passageway therethrough and a plug rotatably mounted in the casing for controlling the passageway, the valve having channels for supplying lubricant to the coacting surfaces of the plug and the casing, a chamber for containing lubricant in communication with the channels, powdered mica in the lubricant chamber, and means for introducing lubricant under pressure into the chamber to compress the powdered mica whereby the powdered mica will force the lubricant into the channels.

10. A valve comprising, a stationary member having a passageway therethrough and a movable member for controlling the passageway, the valve having channels for supplying lubricant to the coacting surfaces of the movable member and the stationary member, a chamber for containing lubricant in communication with the channels, powdered mica in the lubricant chamber, and means for introducing lubricant under pressure into the chamber to compress the powdered mica whereby the powdered mica will force the lubricant into the channels.

SVEN JOHAN NORDSTROM.